US008258671B2

(12) United States Patent
Hatch et al.

(10) Patent No.: US 8,258,671 B2
(45) Date of Patent: Sep. 4, 2012

(54) METHODS AND APPARATUS FOR A CONTINUOUS WOUND LAMINATE ROTOR FLUX PATH

(75) Inventors: Erik Hatch, Cypress, CA (US); Constantin C. Stancu, Anaheim, CA (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 683 days.

(21) Appl. No.: 12/469,191

(22) Filed: May 20, 2009

(65) Prior Publication Data

US 2010/0295411 A1 Nov. 25, 2010

(51) Int. Cl.
*H02K 1/22* (2006.01)
*H02K 1/06* (2006.01)
*H02K 15/00* (2006.01)
*H02K 15/02* (2006.01)

(52) U.S. Cl. ....... 310/261.1; 310/216.004; 310/216.005; 310/216.007; 29/596; 29/598

(58) Field of Classification Search .................. 310/214, 310/216.101, 216.107, 216.109, 216.124–126, 310/261.1, 216.004, 216.005, 216.007, 216.008; 29/598, 596
See application file for complete search history.

(56) References Cited

U.S. PATENT DOCUMENTS 4,187,441 A * 2/1980 Oney .......................... 310/112
6,977,460 B1 * 12/2005 Kaminski et al. ............ 310/262
7,698,803 B2 * 4/2010 Mitsui et al. .................. 29/596
2007/0063612 A1 * 3/2007 Oh .............................. 310/261

FOREIGN PATENT DOCUMENTS

JP 2001298883 A * 10/2001
WO WO 2006028179 A1 * 3/2006

OTHER PUBLICATIONS

Machine Translation JP2001298883 (2001).*

* cited by examiner

*Primary Examiner* — Quyen Leung
*Assistant Examiner* — Jose Gonzalez Quinones
(74) *Attorney, Agent, or Firm* — Ingrassia Fisher & Lorenz P.C.

(57) ABSTRACT

A rotor assembly is assembled by providing an elongated rectangular strip of material having a first edge and a second edge defining a width, cutting the elongated rectangular strip to form a first patterned strip having a first side corresponding to the first edge, winding the first patterned strip portion around the perimeter of the rotor core such that the first edge is adjacent to the perimeter and the patterned strip portion forms a continuous laminated ring structure. Two laminated ring structures can be cut from a single strip, thereby reducing waste material and forming a strong structure.

18 Claims, 3 Drawing Sheets

200
SIDE
120
122
204
W
204
202
124
126
126
122
120
124
SIDE 100
126
124
108
104
122
102
120
106
122
θ
160

120
204
122
t
d
220

120

METHODS AND APPARATUS FOR A CONTINUOUS WOUND LAMINATE ROTOR FLUX PATH

TECHNICAL FIELD

The present invention generally relates to magnetic devices such as electrical motors, and more particularly relates to structures used to retain windings and provide a flux path for rotors in such devices.

BACKGROUND

Electric motors often incorporate a rotor core (e.g., a laminated or solid core rotor) including a number of windings and having some form of structure attached to the outer perimeter of the assembly for retaining the windings and providing a rotor flux path. One such structure is the so called "tooth-top," which is a component that is notched to accept a tooth structure formed on the exterior of the rotor core.

While such tooth-tops are capable of providing a suitable rotor flux path, they are unsatisfactory in a number of respects. For example, their retention capabilities are limited because they are secured for the most part only to the tooth tops, and thus cannot provide a strong radial compression force. Furthermore, since the tooth-tops are not interconnected, they do not in the aggregate provide "hoop strength" (i.e., resistance to internal radial pressure) with respect to the windings and stator core. Furthermore, such rotor flux path designs are typically manufactured as individually machined components that can result in significant material waste.

Accordingly, it is desirable to provide retention/flux path structures that reduce waste, are more effective, and are highly manufacturable. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

In general, the present invention relates to a rotor flux path structure formed from a patterned strip of material wound in a polygonal helical pattern to form a continuous laminated ring structure. In that regard, the following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to electrical motors, magnetism, and the like are not described in detail herein.

In accordance with the present invention, a continuous laminated ring is used for winding retention and to provide a flux path in a wound electric motor rotor. The laminated ring can be formed from a single thin strip of material, thereby reducing waste and forming a strong, laminated structure.

Figure 1:
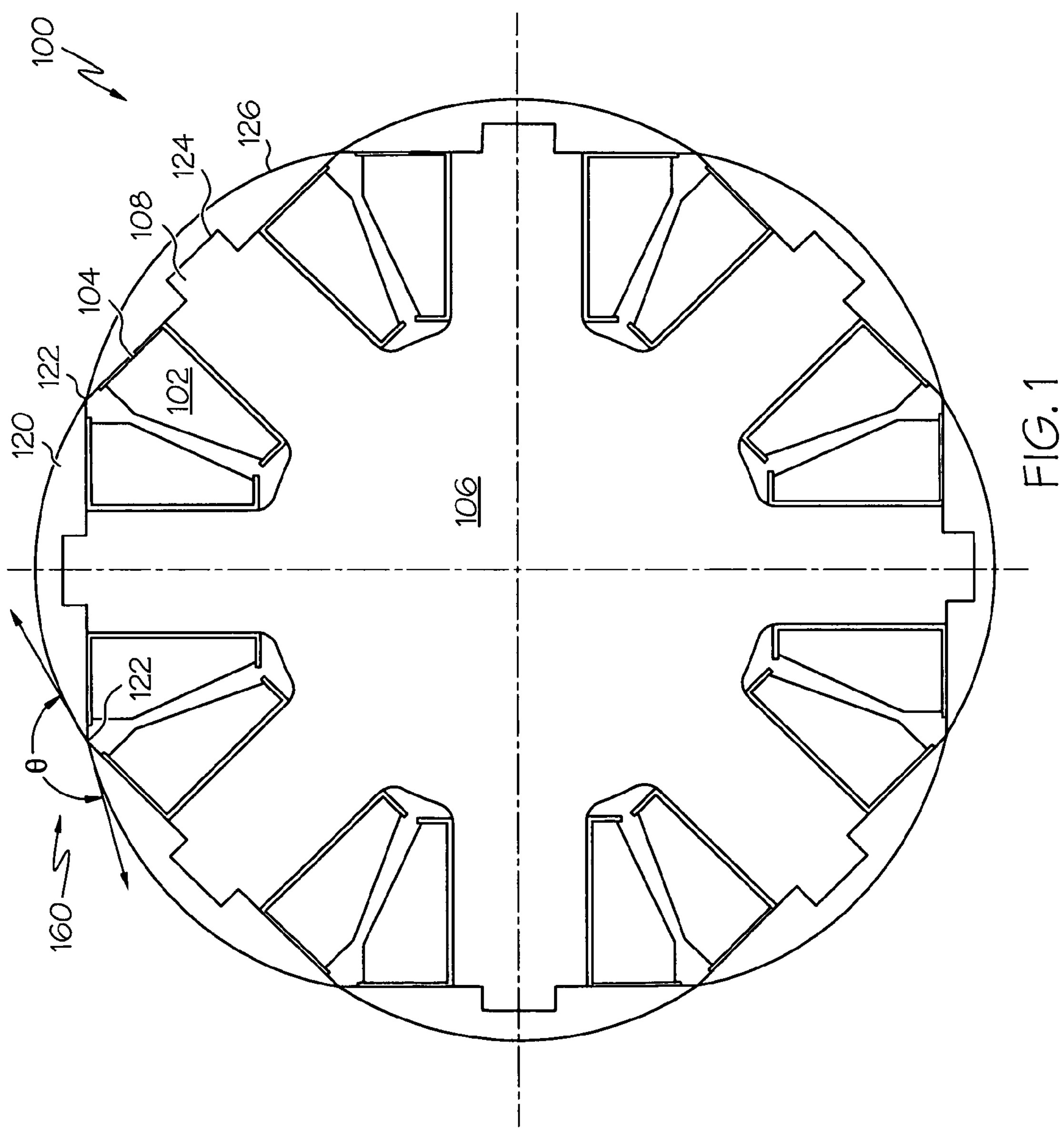
FIG. 1 is cross-sectional overview of a rotor design in accordance with one embodiment.

Referring to the cross-sectional overview shown in FIG. 1, an exemplary rotor assembly 100 generally includes a rotor core 106 (e.g., a laminate or solid core structure, as is known in the art) having an outer perimeter, a plurality of windings 102 within the perimeter of the rotor core, and a continuous laminated ring structure 120 that acts to retain windings 102 while at the same time providing a flux path for rotor core 106. Laminated ring structure may consist of any number of materials typically used for flux paths, including, for example electrical grade steel such as M15 or M19 steel.

A suitable insulation layer 104 may be incorporated between windings 102 and laminated ring structure 120, as is known in the art. Furthermore, the exterior of rotor core 106 may include a series of teeth 108 projecting radially outward. Such teeth 108 are generally distributed equidistantly about the exterior of rotor core 106, and are used to assist in securing laminated ring structure 120 (e.g., via mating indentations or notches 124 within the inner edge of the structure). Ring structure 120 has an outer perimeter 126 characterized by relatively wide arcuate regions and hinged regions 122 provided therebetween to facilitate wrapping the patterned strip around core 106 to form the continuous lamination as shown. For convenience, item 120 will be referred to as both a "patterned strip" and "laminated ring structure," depending upon whether it has been wound slinky-like around rotor core 106.

In the illustrated embodiment, wherein the rotor core 106 is generally octagonal, the outer surface 126 of laminated ring 120 has an external hinge angle (defined by tangents at the hinges 122) that is approximately 180-160 degrees. The shape of the outer surface of the laminated ring may be developed based on, for example, air-gap flux density, the strength of the connecting bridge, and/or the ability to form the bend at the "bridge." Note also that it is not necessary for ring 120 to be octagonal (e.g., as illustrated in the 8-pole configuration); any suitable shape may be used. The number of sides will typically be determined by the number of poles within the machine.

Thus, what has been disclosed is a structure created using a patterned strip of material having a substantially linear edge, a plurality of arcuate (e.g., chord-like) regions, and a plurality of hinge regions 122 adjacent to the arcuate regions, wherein the patterned strip of material is wound in a polygonal helical pattern such that the arcuate regions pivot at the hinge regions 122 to form a continuous laminated ring structure 120 configured to encompass rotor core 106 and the rotor windings 102 incorporated therein. It will be appreciated that the resulting laminated ring structure 120 acts to restrain windings 102 from radial movement during rotation, and also acts as a flux path with respect to rotor core 106 and windings 102 during operation. An exemplary method of making a rotor assembly 100 will now be described.

Figure 2:
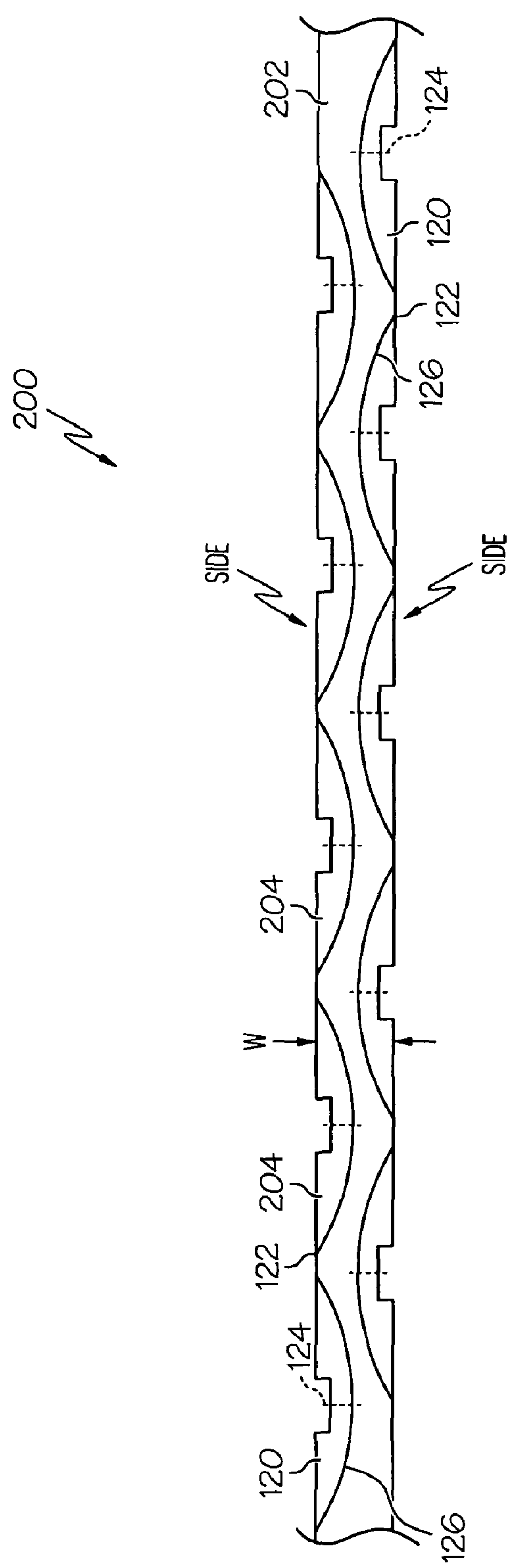
FIG. 2 is an exemplary patterned material strip in accordance with one embodiment.

Referring to FIG. 2, an elongated rectangular strip of material 200 is first provided. Strip 200 has two opposite edges 220 and 222 defining a width was shown. The width may vary depending upon the particular design objectives and shapes of the patterned strips.

A suitable cutting, stamping, or other material-removal operation is performed to cut elongated rectangular strip 200 to form a first patterned strip 120 having a linear side corresponding to edge 220. At the same time, a second patterned strip 120 having a linear side corresponding to edge 220 may be patterned. As a result, a relatively small amount of waste material 202 is produced.

Next, patterned strip 120 is wound in a circular, helical fashion about the perimeter of rotor core 106 such that the first edge 220 is adjacent to the perimeter of rotor core 106 (and/or insulation 104) and the patterned strip forms a continuous laminated ring structure 120. The individual laminate layers could be secured using adhesives, welding, staking, rivets, or any other suitable method.

Figure 3:
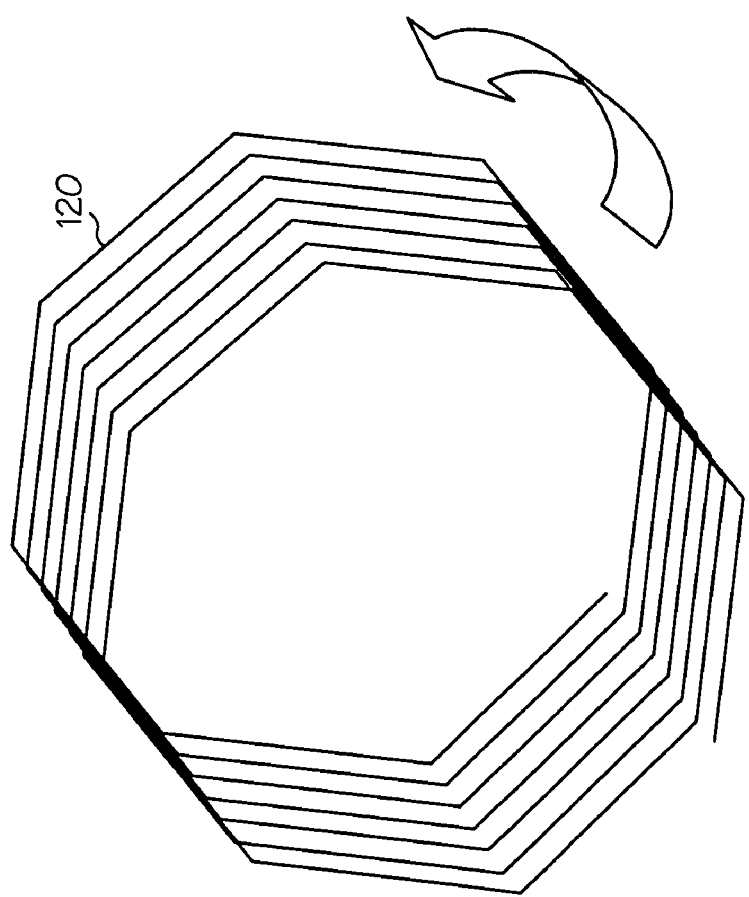
FIG. 3 conceptually illustrates a laminate structure formed by a polygonal helix.

As shown in FIG. 2, each of the patterned strips 120 includes a plurality of arcuate regions 204 separated by respective hinge regions 122. In this way, the winding step will include pivoting the arcuate regions 204 at the hinge regions 122 such that the first edge 220 of patterned strip 120 forms a polygonal helix. This is illustrated in FIG. 3, which shows a conceptual isometric view of the winding pattern forming an octagonal helical structure. Note that the present invention is not limited to particular shapes and hinge dimensions. Any strip shape that may be wrapped into a laminated structure may be used.

Figure 4:
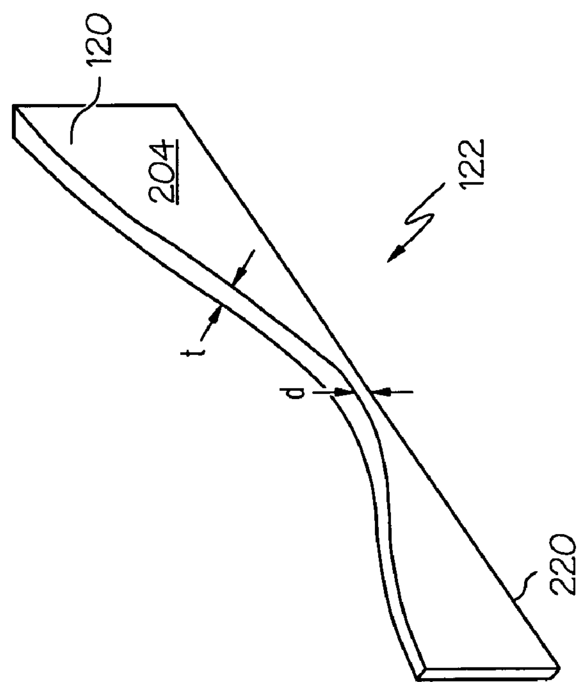
FIG. 4 is an isometric cut-away view of a patterned strip in accordance with one embodiment.

As shown in FIG. 4, strip 120 as formed will have a thickness t, and a hinge width d. Both of these parameters may be selected to achieve the desired mechanical and magnetic properties.

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A method of making a rotor assembly, comprising:

providing a rotor core having a perimeter;

disposing a plurality of windings within the perimeter of the rotor core;

providing an elongated rectangular strip of material having a first edge and a second edge defining a width;

cutting the elongated rectangular strip to form a first patterned strip having a first side corresponding to the first edge;

winding the first patterned strip portion around the perimeter of the rotor core such that the first edge is adjacent to the perimeter and the patterned strip portion forms a continuous laminated ring structure; and cutting the elongated rectangular strip to form a second patterned strip having a first side corresponding to the second edge.

2. The method of claim 1, wherein the first patterned strip includes a plurality of arcuate regions separated by respective hinge regions, and wherein the winding step includes pivoting the arcuate regions at the hinge regions such that the first side of the patterned strip forms a polygonal helix.

3. The method of claim 2, wherein the outer perimeter includes a plurality of tooth structures, and wherein the arcuate regions each include a notch configured to accept one of the tooth structures.

4. The method of claim 1, wherein the elongated rectangular strip comprises a steel material.

5. The method of claim 1, wherein the sum of the volumes of the first patterned strip and the second patterned strip is greater than approximately 50% of the total volume of the elongated rectangular strip.

6. The method of claim 2, wherein the continuous laminated ring structure is configured to restrain the windings.

7. The method of claim 2, wherein the continuous laminated ring structure forms a rotor flux path.

8. The method of claim 4, wherein the elongated rectangular strip comprises an electrical-grade steel.

9. A rotor assembly comprising:

a rotor core having a perimeter;

a plurality of windings within the perimeter of the rotor core;

a winding retention structure comprising a patterned strip of material having a substantially linear edge, the patterned strip of material wound around the perimeter of the rotor core in a helical pattern such that the substantially linear edge is adjacent to the perimeter and the patterned strip portion forms a continuous laminated ring structure, wherein the patterned strip of material includes a plurality of arcuate regions separated by respective hinge regions, and wherein the arcuate regions are pivoted at the hinge regions such that the first side of the patterned strip forms a polygonal helix and the continuous laminated ring structure forms a rotor flux path.

10. The rotor assembly of claim 9, wherein the patterned strip includes a plurality of arcuate regions separated by respective hinge regions.

11. The rotor assembly of claim 10, wherein the perimeter includes a plurality of tooth structures, and wherein the arcuate regions each include a notch configured to accept one of the tooth structures.

12. The rotor assembly of claim 9, wherein the patterned strip comprises steel.

13. The rotor assembly of claim 9, wherein the continuous laminated ring structure is configured to restrain the windings.

14. The rotor assembly of claim 9, wherein the continuous laminated ring structure forms a rotor flux path.

15. The rotor assembly of claim 12, wherein the patterned rectangular strip comprises an electrical grade steel.

16. A rotor winding retention structure comprising:

a patterned strip of material having a substantially linear edge, a plurality of arcuate regions, and a plurality of hinge regions adjacent the arcuate regions;

wherein the patterned strip of material is wound in a polygonal helical pattern such that the arcuate regions pivot at the hinge regions to form a continuous laminated ring structure configured to encompass a rotor core having a rotor winding incorporated therein such that the continuous laminated ring structure forms a rotor flux path.

17. The rotor winding retention structure of claim 16, wherein the patterned strip of material comprises an electrical grade steel.

18. The rotor winding retention structure of claim 16, wherein the arcuate regions include a cutout region configured to accept a tooth provided on the rotor core.

* * * * *